(12) United States Patent
Lewis

(10) Patent No.: US 6,352,150 B1
(45) Date of Patent: Mar. 5, 2002

(54) COATED ENDLESS BELT

(76) Inventor: William J. Lewis, 1312 Galloway Dr., Woodstock, IL (US) 60098

( * ) Notice: Subject to any disclaimer, the term of this patent is extended or adjusted under 35 U.S.C. 154(b) by 0 days.

(21) Appl. No.: 09/480,807

(22) Filed: Jan. 10, 2000

(51) Int. Cl.7 ............................................... B65G 15/30
(52) U.S. Cl. ...................................................... 198/846
(58) Field of Search ............................. 198/844.1, 846, 198/848, 849, 713, 714; 474/135, 117

(56) References Cited

U.S. PATENT DOCUMENTS 3,783,704 A * 1/1974 Lawson ........................ 474/254
4,635,788 A * 1/1987 McDonald ................... 198/848

* cited by examiner

Primary Examiner—Kenneth W. Noland
(74) Attorney, Agent, or Firm—Pauley Petersen Kinne & Fejer

(57) ABSTRACT

A continuous single-ply endless belt made of a woven material and coated with a non-stick material. The continuous single-ply endless belt has a uniform thickness in a peripheral direction. The woven material of the endless belt is made of a plurality of warp fibers and fill fibers of at least one of a fiberglass material, an aramid material, a lightweight fire-resistant nylon fiber material and a new high temperature fiber. The non-stick material coats at least a portion of the fibers positioned at or near an outer periphery of the woven material and mechanically attaches to the fibers of the woven material.

14 Claims, 1 Drawing Sheet

COATED ENDLESS BELT

BACKGROUND OF THE INVENTION

FIELD OF THE INVENTION

This invention relates to a coated endless belt of a woven material. More specifically, this invention relates to a continuous single-ply endless belt of woven material having a uniform thickness in a peripheral direction and coated with a non-stick material.

DESCRIPTION OF RELATED ART

Conventional endless belts are used in packaging machinery and equipment, for food processing and other applications. Generally, the conventional endless belts are single-ply endless belts or two-ply endless belts. Conventional endless belts, sometimes referred to as release belts, can be used, for example as a conveyor belt. At a first temperature, an object is positioned on an outer surface of the endless belt. At a second temperature which is different from the first temperature, such as when the object is heated or melted, the physical properties of the object change and the object sticks or adheres to the outer surface of the endless belt and then when cooled the object being conveyed no longer sticks or adheres to the outer surface of the endless belt and thus releases from the endless belt.

A conventional single-ply endless belt 10, as shown in FIG. 1, has a first end portion 12 which overlaps and is secured, such as heat sealed or mechanically connected, to a second end portion 14. Single-ply endless belt 10 can fail or break at or near heat sealed portion 15, for example as a result of flexing or twisting single-ply endless belt 10 during use. Further, because of the non-uniform thickness at or near a heat sealed portion 15, single-ply endless belt 10 encounters considerable heat transfer problems which are not easily remedied.

As shown in FIG. 2, two strips of woven material, having approximately equal lengths, are connected to form a two-ply strip of woven material. A first end portion 21 of the two-ply strip is heat sealed to a second end portion 22 of the two-ply strip at a flex point or flex area 23 to form a two-ply endless belt 20. Two-ply endless belt 20 can fail at flex area 23 when two-ply endless belt 20 is flexed or twisted during use. Further, non-uniform heat transfer occurs at or near flex area 23.

There is an apparent need for a single-ply endless belt coated with a non-stick material and having a uniform thickness in a running or peripheral direction, to provide uniform heat transfer properties and increased strength.

SUMMARY OF THE INVENTION

It is an object of this invention to provide an endless belt made of a woven material and coated with a non-stick material, having a uniform thickness in a peripheral direction, which provides uniform heat transfer properties and increased tensile strength.

The above and other objects of this invention are accomplished with an endless belt made of a woven material coated with a non-stick material. Preferably, the endless belt is a continuous single-ply endless belt having a uniform thickness in a running or peripheral direction and preferably but not necessarily in a longitudinal or axial direction. Thus, the endless belt of this invention is better than conventional single-ply endless belts and two-ply endless belts, particularly for use in high temperature environments.

At a first temperature, an object is positioned on an outer surface of the endless belt. At a second temperature, different from the first temperature, the physical properties of the object change and the object sticks or adheres to the outer surface of the endless belt and then when cooled the object being conveyed no longer sticks or adheres to the outer surface of the endless belt.

In one preferred embodiment of this invention, the woven material of the endless belt is made of a plurality of warp fibers, oriented in a peripheral direction, and a plurality of weft or fill fibers oriented in a longitudinal direction. Preferably, each of the warp fibers and the fill fibers are made of a fiberglass material, an aramid material, a lightweight fire-resistant nylon fiber material and/or any other suitable high-temperature fiber.

In one preferred embodiment of this invention, the endless belt is coated with a non-stick material. Preferably but not necessarily, the non-stick material is a TEFLON material or polytetrafluoroethylene (PTFE) material.

During a coating process, a coating or a layer of a non-stick material is applied to the woven material so that the non-stick material coats at least a portion of the fibers forming the woven material. In one preferred embodiment of this invention, the portion of the fibers coated by the non-stick material includes fibers positioned near an outer periphery of the woven material. During one preferred coating process, the applied coating is heated to a fusion point or a sintering point, so that the non-stick material is fused or sintered to the fibers of the woven material and mechanically attached by solidifying or hardening within spaces of each fiber and spaces between adjacent fibers.

BRIEF DESCRIPTION OF THE DRAWINGS

The drawings show prior art endless belts and different features of the improved single-ply endless belt according to preferred embodiments of this invention, wherein.

DETAILED DESCRIPTION OF PREFERRED EMBODIMENTS

Figure 3:
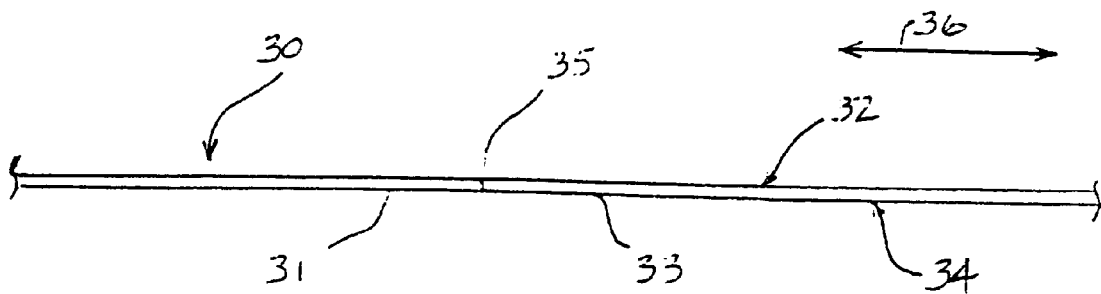
FIG. 3 is a schematic side view of a coated single-ply endless belt of a woven material, according to one preferred embodiment of this invention.
Figure 1:
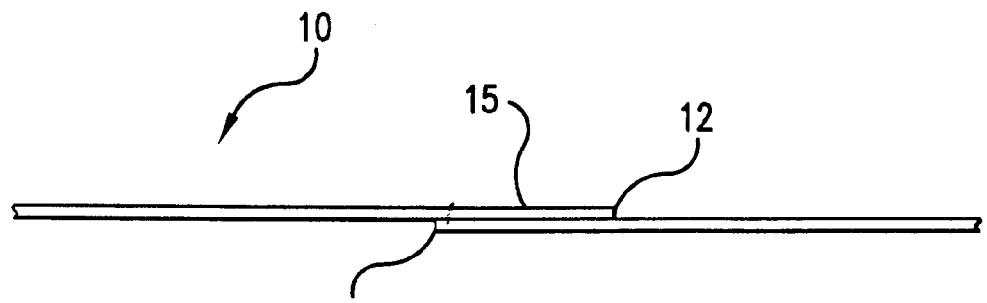
Figure 2:
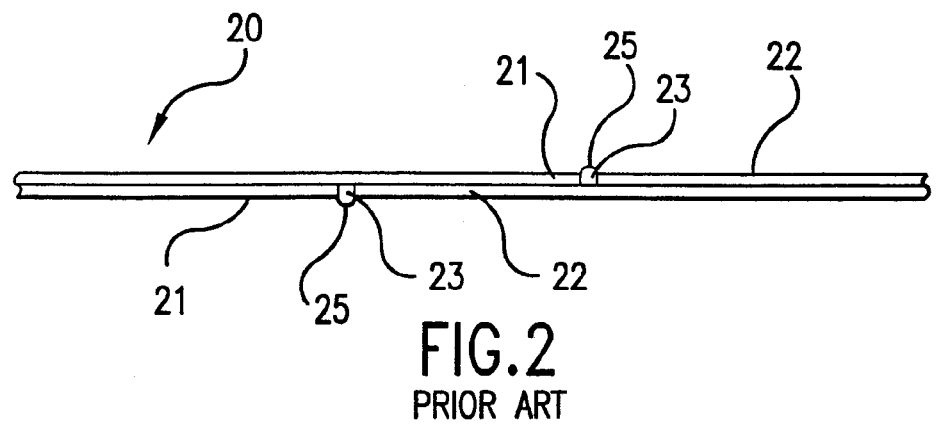
Figure 3:
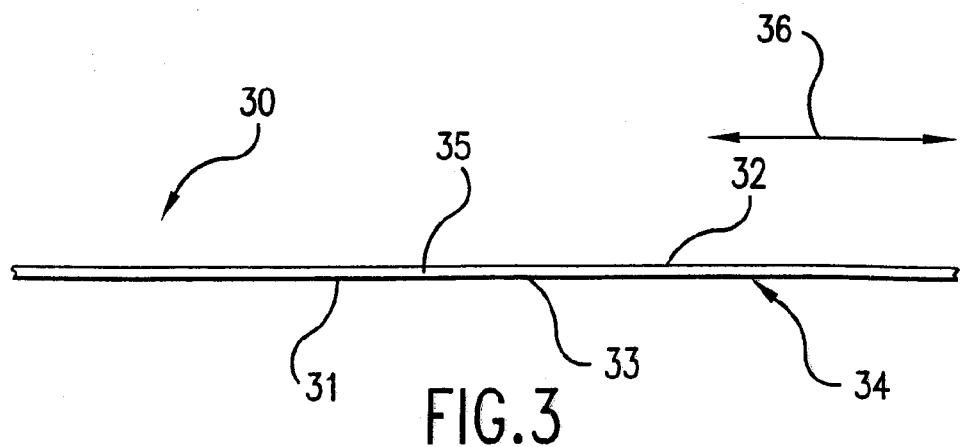

Referring to FIG. 3, an endless wrap or belt 30 comprises a woven material coated with a non-stick material. Endless belt 30 can have any suitable peripheral length, width and/or thickness depending on the desired use of endless belt 30. Endless belt 30 normally moves in a running direction or a peripheral direction as shown by arrow 36, in FIG. 3. A first end portion 31 is connected to a second end portion 33 of a woven material. In one preferred embodiment of this invention, first end portion 31 and second end portion 33 are continuously woven together at belt portion 35 to form a continuous single-ply endless belt 30. Continuous single-ply endless belt 30 of this invention is able to withstand higher flexing and twisting stresses than conventional heat sealed endless belts.

Preferably, endless belt 30 has a uniform thickness in a peripheral direction and in a longitudinal direction. Endless belt 30 with uniform thickness in the peripheral direction is better suited than conventional single-ply and two-ply endless belts for use as, for example a release belt in packaging machinery and equipment, for food processing and other high-temperature processes. At a first temperature, an object is positioned on an outer surface 32 of endless belt 30. However, at a second temperature different from the first temperature, the physical properties of the object change and the object sticks or adheres to outer surface 32 and then when cooled the object being conveyed no longer sticks or adheres to outer surface 32 and thus releases from endless belt 30.

Endless belt 30 is stronger than conventional endless belts 10, 20 because endless belt 30 does not have heat sealed or mechanically connected end portions. Further, unlike conventional single-ply endless belt 10, endless belt 30 provides uniform heat transfer because endless belt 30 is a continuous single-ply and has uniform thickness in the peripheral direction. Additionally, endless belt 30 with a continuous single-ply has better heat transfer characteristics than conventional two-ply endless belt 20 because, for one reason, heat sealing irregularities 25 are eliminated.

In one preferred embodiment of this invention, the woven material of endless belt 30 comprises a plurality of warp fibers, oriented in a peripheral direction, and a plurality of fill fibers oriented in a longitudinal direction. Preferably, the warp fibers and the fill fibers are interwoven. The warp fibers comprise a fiberglass material, an aramid material, a lightweight fire-resistant nylon fiber material and/or any other suitable high-temperature material. Similarly, the fill fibers comprise a fiberglass material, an aramid material, a lightweight fire-resistant nylon fiber material and/or any other suitable high-temperature material.

The term fiberglass as used throughout this specification and in the claims refers to extruded filaments of glass made into yarn that is woven into textiles. Suitable fiberglass materials according to a preferred embodiment of this invention include, for example, E-glass and S-glass having glass filament diameters of size B, C, D, DE, E, G, H and K, as known to those having ordinary skill in the art.

The term aramid as used throughout this specification and in the claims refers to aromatic polyamides. Aromatic polyamides include any group of very strong, lightweight synthetic fibers. Suitable aramid fibers according to a preferred embodiment of this invention include, for example, KEVLAR 29 fibers and KEVLAR 49 fibers, which are trademarks for aramid fibers manufactured by the I.E. Dupont Co., and TWARON fibers, which is a registered trademark of Akzo Noble Co.

Further, any lightweight fire-resistant nylon fibers, for example, NOMEX fibers, which is a trademark for high temperature nylon fibers manufactured by the I.E. Dupont Co., and any other suitable high-temperature fibers may be suitable for the warp fibers and the fill fibers of the woven material of endless belt 30.

Any combination of fibers may be used to make the woven material of endless belt 30. For example, the warp fibers or the fill fibers may be fiberglass fibers while the fill fibers or the warp fibers, respectively, may be aramid fibers such as KEVLAR fibers and/or TWARON fibers, and/or high temperature nylon fibers such as NOMEX fibers.

In one preferred embodiment of this invention, an outer surface 32 and an inner surface 34 of endless belt 30 is coated with a non-stick material. Preferably but not necessarily, the non-stick material is a TEFLON material or other suitable non-stick material. Suitable non-stick materials according to a preferred embodiment of this invention include but are not limited to: tetrafluoroethylene (TFE); polytetrafluoroethylene (PTFE); fluorinated ethylene propylene (FEP); perfluoroalkoxy (PFA); and any combination of the above-referenced materials. Other suitable non-stick materials according to this invention include, but are not limited to, silicone rubber and fluorosilicone.

During a coating process, a coating or a layer of a non-stick material is applied, preferably having a uniform thickness, to the woven material. The applied coating is then heated to a fusion point or a sintering point, so that the non-stick material is fused or sintered to the fibers comprising the woven material. In one preferred embodiment of this invention, the portion of the fibers coated by the nonstick material includes the fibers positioned at or near an outer periphery of the woven material, for example near outer surface 32 and/or inner surface 34. During the coating process, the non-stick material penetrates or is absorbed into spaces within the fibers of the woven material comprising endless belt 30 and/or into spaces between adjacent fibers.

Typically, after the non-stick material coating is fused or sintered to the woven material, coated endless belt 30 is then cooled. During a cooling process, the non-stick material of this invention is mechanically attached to the portion of the fibers which the non-stick material coats. As the non-stick material is allowed to cool and solidify, light adhesion and mechanical bonding occurs between the non-stick material and the fibers of the woven material.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. In an endless belt of a woven material, the improvement comprising: a non-stick material coating an endless woven material, wherein the non-stick material comprises at least one of a tetrafluoroethylene (TFE) material, a polytetrafluoroethylene (PTFE) material, a fluorinated ethylene propylene (FEP) material, a perfluoroalkoxy (PFA) material, a silicone rubber material and a fluorosilicone material.

2. In the endless belt of the woven material according to claim 1 wherein the woven material comprises a plurality of fibers, and the non-stick material coats at least a portion of the fibers.

3. In the endless belt of the woven material according to claim 2 wherein the portion comprises the fibers positioned near an outer periphery of the woven material.

4. In the endless belt of the woven material according to claim 2 wherein the non-stick material is mechanically attached to the at least a portion of the fibers.

5. In the endless belt of the woven material according to claim 1 wherein the woven material comprises a plurality of warp fibers and a plurality of fill fibers.

6. In the endless belt of the woven material according to claim 1 wherein the endless belt has a uniform thickness in a peripheral direction.

7. In the endless belt of the woven material according to claim 1 wherein the endless belt is a continuous single-ply belt.

8. In an endless belt of a woven material, the improvement comprising:

a non-stick material coating an endless woven material; and the woven material comprising a plurality of warp fibers and a plurality of fill fibers, wherein the warp fibers comprise at least one of a fiberglass material, an aramid material and a lightweight fire-resistant nylon fiber material.

9. In the endless belt of the woven material according to claim 8 wherein the fill fibers comprise at least one of a fiberglass material, an aramid material and a lightweight fire-resistant nylon fiber material.

10. In the endless belt of the woven material according to claim 8 wherein the endless belt has a uniform thickness in a peripheral direction.

11. In the endless belt of the woven material according to claim 8 wherein the endless belt is a continuous single-ply belt.

12. In an endless belt of a woven material, the improvement comprising:

a non-stick material coating an endless woven material; and the woven material comprising a plurality of warp fibers and a plurality of fill fibers, wherein the fill fibers comprise at least one of a fiberglass material, an aramid material and a lightweight fire-resistant nylon fiber material.

13. In the endless belt of the woven material according to claim 12 wherein the endless belt has a uniform thickness in a peripheral direction.

14. In the endless belt of the woven material according to claim 12 wherein the endless belt is a continuous single-ply belt.

* * * * *

UNITED STATES PATENT AND TRADEMARK OFFICE
CERTIFICATE OF CORRECTION

Figure 1:
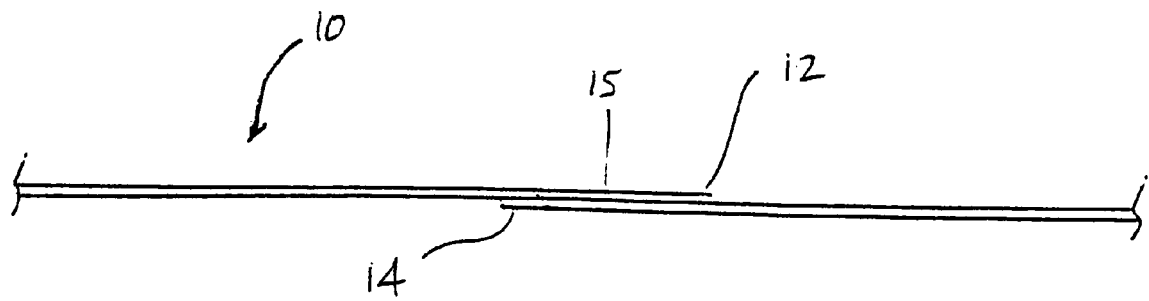
FIG. 1 is a schematic side view of a conventional heat sealed single-ply endless belt.
Figure 2:
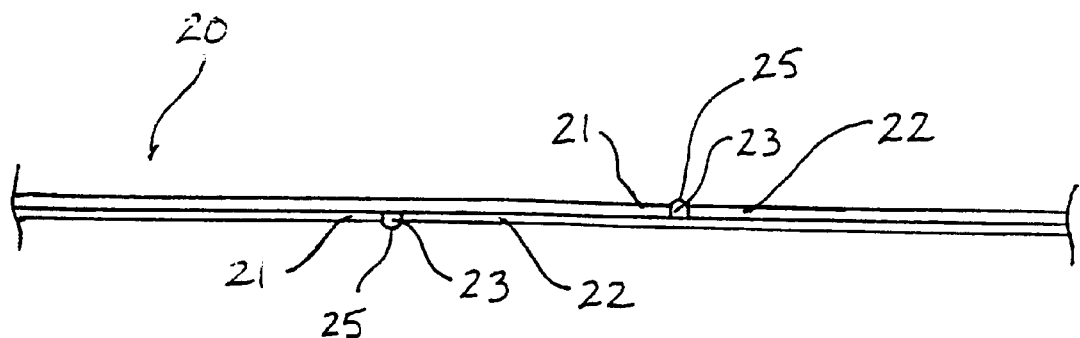
FIG. 2 is a schematic side view of a conventional heat sealed two-ply endless belt.

PATENT NO.    : 6,352,150 B1
DATED         : March 5, 2002
INVENTOR(S)   : William J. Lewis It is certified that error appears in the above-identified patent and that said Letters Patent is hereby corrected as shown below:

Drawings,
Please replace informal Fig. 3 with formal Fig. 3.
Replace informal drawing, Figs. 1-3, with formal drawings, Figs. 1-3.

Signed and Sealed this

Fourteenth Day of October, 2003

JAMES E. ROGAN
*Director of the United States Patent and Trademark Office*

United States Patent
Lewis

(10) Patent No.: US 6,352,150 B1
(45) Date of Patent: Mar. 5, 2002

(54) COATED ENDLESS BELT

(76) Inventor: William J. Lewis, 1312 Galloway Dr., Woodstock, IL (US) 60098

(*) Notice: Subject to any disclaimer, the term of this patent is extended or adjusted under 35 U.S.C. 154(b) by 0 days.

(21) Appl. No.: 09/480,807

(22) Filed: Jan. 10, 2000

(51) Int. Cl.$^7$ .................................. B65G 15/30
(52) U.S. Cl. ................................................ 198/846
(58) Field of Search ........................ 198/844.1, 846, 198/848, 849, 713, 714; 474/135, 117

(56) References Cited

U.S. PATENT DOCUMENTS 3,783,704 A * 1/1974 Lawson ........................ 474/254
4,635,788 A * 1/1987 McDonald .................... 198/848

* cited by examiner

Primary Examiner—Kenneth W. Noland
(74) Attorney, Agent, or Firm—Pauley Petersen Kinne & Fejer

(57) ABSTRACT

A continuous single-ply endless belt made of a woven material and coated with a non-stick material. The continuous single-ply endless belt has a uniform thickness in a peripheral direction. The woven material of the endless belt is made of a plurality of warp fibers and fill fibers of at least one of a fiberglass material, an aramid material, a lightweight fire-resistant nylon fiber material and a new high temperature fiber. The non-stick material coats at least a portion of the fibers positioned at or near an outer periphery of the woven material and mechanically attaches to the fibers of the woven material.

14 Claims, 1 Drawing Sheet

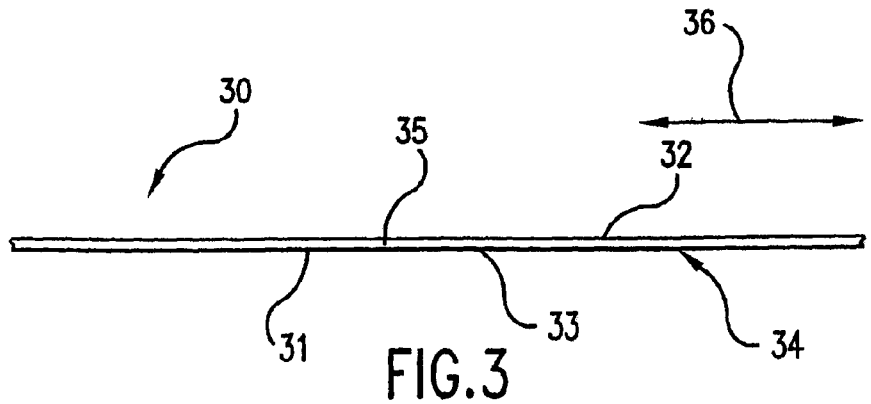

FIG.3